US012683036B2

(12) United States Patent
Wölfel et al.

(10) Patent No.: US 12,683,036 B2
(45) Date of Patent: Jul. 14, 2026

(54) ANTI-SCATTER GRID WITH AN END STOP ELEMENT FOR STACKED ARRANGEMENT WITH A SENSOR ELEMENT

(71) Applicant: Siemens Healthineers AG, Forchheim (DE)

(72) Inventors: Stefan Wölfel, Dormitz (DE); Michael Teuber, Forchheim (DE); Michaela Katharina Faber, Möhrendorf (DE)

(73) Assignee: Siemens Healthineers AG, Forchheim (DE)

(*) Notice: Subject to any disclaimer, the term of this patent is extended or adjusted under 35 U.S.C. 154(b) by 169 days.

(21) Appl. No.: 18/520,873

(22) Filed: Nov. 28, 2023

(65) Prior Publication Data

US 2024/0177881 A1 May 30, 2024

(30) Foreign Application Priority Data

Nov. 29, 2022 (DE) ..................... 10 2022 212 802.8

(51) Int. Cl.
*G21K 1/02* (2006.01)

(52) U.S. Cl.
CPC .................................... *G21K 1/025* (2013.01)

(58) Field of Classification Search
CPC .. G21K 1/025; A61B 6/06; A61B 6/42; A61B 6/4291; G01N 23/046
See application file for complete search history.

(56) References Cited

U.S. PATENT DOCUMENTS

| | | | | |
|---|---|---|---|---|
| 2010/0061520 | A1 | 3/2010 | Dorscheid et al. | |
| 2011/0019801 | A1 | 1/2011 | Eichenseer et al. | |
| 2016/0078972 | A1 | 3/2016 | Reitz et al. | |
| 2021/0280335 | A1* | 9/2021 | Woelfel | G21K 1/025 |

FOREIGN PATENT DOCUMENTS

| | | | |
|---|---|---|---|
| DE | 102010011581 | A1 | 2/2011 |
| DE | 102014218462 | A1 | 3/2016 |
| DE | 202018000265 | U1 | 2/2018 |
| WO | 2008007309 | A1 | 1/2008 |

* cited by examiner

*Primary Examiner* — Kiho Kim
(74) *Attorney, Agent, or Firm* — Lempia Summerfield Katz LLC

(57) ABSTRACT

An anti-scatter grid for stacked arrangement with a sensor element for the detection of X-ray radiation having a collimator element with a plurality of collimator walls having a wall height, that are arranged adjoining one another in at least one first direction perpendicularly to the stacking direction of the stacked arrangement. At least one collimator wall of the collimator element has at least one end stop element in the form of a protrusion protruding beyond the wall height along the stacking direction for a positioning of the sensor element relative to the collimator element.

11 Claims, 4 Drawing Sheets

ANTI-SCATTER GRID WITH AN END STOP ELEMENT FOR STACKED ARRANGEMENT WITH A SENSOR ELEMENT

CROSS REFERENCE TO RELATED APPLICATIONS

This application claims the benefit of DE 10 2022 212 802.8, filed on Nov. 29, 2022, which is hereby incorporated by reference in its entirety.

FIELD

Embodiments relate to an anti-scatter grid for stacked arrangement with a sensor element for the detection of X-ray radiation including a collimator element with a plurality of collimator walls where at least one collimator wall of the collimator element has at least one end stop element for positioning the sensor element relative to the collimator element.

BACKGROUND

Medical imaging apparatuses based upon X-ray radiation typically include an X-ray source and an X-ray detector positioned opposite thereto. In a computed tomography (CT) system for example, the X-ray source and the X-ray detector are arranged diametrically opposite one another on a rotor. During a scan of an object to be imaged, for example a patient, the object is positioned in an examination region of the computed tomography system and the X-ray source and the X-ray detector rotate about the object while the X-ray source emits X-ray radiation. The X-ray radiation that passes through the object is captured by one or more detector elements, also known as detector pixels or pixel elements, of the X-ray detector and, on the basis of the locally captured X-ray radiation, a measurement signal is generated. Since, on passing through the object, dependent upon local properties of the object, the X-ray radiation interacts and for example is attenuated, in this way properties of the object may be deduced. In order to suppress scattered radiation arising during a recording in a medical imaging apparatus, X-ray detectors are equipped with anti-scatter grids (ASGs). Modern computed tomography systems are equipped, for example, with 3D anti-scatter grids which have an essentially three-dimensional grid structure. These 3D anti-scatter grids enable a suppression of the scattered radiation in the radial direction (q-direction, rotation direction) and in the axial direction (advancing direction, perpendicular to the rotation direction). Apart from such three-dimensional grid structures, in simpler implementations of anti-scatter grids, those that provide collimator walls and thereby a suppression of scattered radiation only along one direction, may also be used.

For example, in a CT system, it is essential that the imaging components (radiator and detector unit) are oriented mechanically very precisely relative to one another, and the relative orientation also remains unchanged under rotation. This also applies for the arrangement of an anti-scatter grid relative to the detector and/or for example to the sensor element of the detector. Therein, the positioning of the anti-scatter grid relative to the sensor has a decisive influence on the image quality.

The orientation of an anti-scatter grid often takes place with the aid of mounting tools that have end stop surfaces for the individual components to be oriented relative to one another. The ASG may be positioned in a mounting tool, for example, by a plurality of end stop surfaces thereof, with the aid of which, the sensor is then positioned relative to the anti-scatter grid. The accuracy with which the sensor is subsequently positioned relative to the anti-scatter grid now depends at least upon the following tolerance values, for example the sum thereof: tolerance of the end stop surface on the anti-scatter grid, tolerance of the end stop (anti-scatter grid) in the mounting tool, tolerance of the end stop (sensor) in the mounting tool, tolerance of the mechanical guidance of movable parts of the mounting tool, and tolerance of the end stop surface of the sensor.

The required accuracy may therein be achieved only by way of minimizing the individual tolerances, that results in a high production quality of the components themselves as well as a high mechanical effort for the mounting tools.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide an anti-scatter grid by which an improved relative positioning thereof relative to a sensor element in a stacked arrangement may be achieved. Embodiments further provide a method for providing a stacked arrangement of such an anti-scatter grid and a sensor element where a precise orientation of the components is better achieved. Embodiments further provide an improved X-ray detector and a medical imaging device including such an anti-scatter grid.

Embodiments relate to an anti-scatter grid for stacked arrangement with a sensor element for the detection of X-ray radiation, including a collimator element with a plurality of collimator walls, including a wall height, that are arranged adjoining one another in at least one first direction perpendicularly to a stacking direction. At least one collimator wall of the collimator element has at least one end stop element in the form of a protrusion protruding beyond the wall height along the stacking direction for a positioning of the sensor element relative to the collimator element.

The stacking direction extends substantially parallel to a beam incidence direction of X-ray radiation for irradiating an X-ray detector when the anti-scatter grid is inserted in such a detector in a stacked arrangement with a sensor element. The first direction may then extend, for example, substantially perpendicularly to the beam incidence direction.

The collimator walls are configured and/or oriented substantially parallel to the stacking direction and are arranged adjacently along the first direction. A deviation of the parallel orientation of the stacking direction of up to 15 degrees, for example less than 5 degrees may be included. This may include the collimator walls being oriented slightly inclined toward a focus point of an X-ray source arranged for the exposure of an X-ray detector by which the anti-scatter grid is included. The collimator walls are therein arranged spaced from one another such that a through channel is provided between each pair of adjacent collimator walls. The orientation substantially along the stacking direction permits the passage of the X-ray radiation from the beam incidence direction through the anti-scatter grid, whereas X-ray radiation scattered from the beam incidence direction, that may have a negative effect on the image quality, may be absorbed by the collimator walls.

The collimator walls may include a material that absorbs X-ray radiation such that a suppression of scattered radiation that arises in an imaging application during an exposure and trans irradiation of an object is ensured to a sufficient extent at least along the first direction. The collimator walls include, for example, a material that strongly absorbs X-ray radiation, i.e. has a high coefficient of absorption for X-ray radiation, for example, a higher coefficient of absorption than bone tissue. For example, the collimator walls may include a metallic material. The collimator walls may include tungsten. The plurality of collimator walls may however include lead, molybdenum, zinc or another material or composite material.

According to one variant, apart from the first plurality of collimator walls, the collimator element also includes a second plurality of collimator walls that are arranged adjoining one another in a second direction perpendicularly to the first direction and perpendicularly to the stacking direction. A 3D ASG is provided that provides an improved suppression of the scattered radiation along two directions, and thus an improved image quality, to be achieved.

The anti-scatter grid is provided for a stacked arrangement with a sensor element for the detection of X-ray radiation. The sensor element may therein be a direct-converting or an indirect-converting sensor element. For example, the sensor element that is provided for the stacked arrangement with the anti-scatter grid may include CdTe, CZT, CdZnTeSe, CdTeSe, CdMnTe, InP, TlBr2, HgI2, GaAs or other material. It may however also include GOS (Gd2O2S), CsJ, YGO or LuTAG. In this case for example, a component that is positioned and mounted as a unit for a provision of a stacked arrangement relative to the anti-scatter grid is to be understood as the sensor element. This may be present in the form of a single-piece sensor element or as a sensor element assembled from a plurality of elements.

The collimator walls of the collimator element include a wall height. The wall height of each collimator wall of the collimator element extends substantially along the stacking direction. The wall height of the collimator walls of a collimator element may be substantially the same. If the collimator element includes an orientation of the collimator walls to the focus point of an X-ray source provided for exposing the X-ray detector, then the actual extent of the collimator walls along the beam incidence direction may readily differ for edge and centrally arranged collimator walls. Usually, however, by way of the arrangement of the collimator walls both on a radiation entry side and also on the radiation exit side of the collimator element, a substantially planar area is formed. In a stacked arrangement with a sensor element, the radiation exit side is the side that faces toward the sensor element. The radiation entry side is then the side that is opposite to the radiation exit side and faces away from the sensor element in a stacked arrangement with a sensor element.

The at least one end stop element lies on a collimator wall of the collimator element in the form of a protrusion protruding beyond the wall height of the collimator wall along the stacking direction. The end stop element consequently extends beyond the wall height of the respective collimator wall on which it is arranged. The end stop element is therein provided on a radiation exit side of the collimator element. It may protrude, for example, beyond a substantially planar area of the collimator element formed by the arrangement of the collimator walls on the radiation exit area. This does not preclude, however, that end stop elements may be provided also at other sites on the collimator element. The end stop element therein forms an end stop surface for a sensor element to be positioned in a stacked arrangement thereon. This may then serve, in a positioning of the sensor element relative to the collimator element, i.e. when preparing a stacked arrangement of an anti-scatter grid and a sensor element, as an aid for the relative positioning of the components to one another.

The end stop element may be arranged, for example, on an outer wall of the collimator element. It may, however, also be arranged on a collimator wall arranged centrally in the collimator element. The end stop element is arranged, for example, on the collimator element, such that by way of the end stop element, an area facing the sensor element in the stacked arrangement on the radiation exit side of the collimator element is delimited at least on one side by the end stop surface of the end stop element. The delimited area is, for example, equal to the areal extent of the sensor element to be arranged in a stacked arrangement therewith. The area delimited on at least one side by the end stop element is then provided in a preparation of a stacked arrangement for the arrangement of the sensor element.

The end stop element may be made of the same material as the collimator wall. The end stop element may be provided integrally with the collimator wall on which it is arranged. The end stop element may then be produced in a common manufacturing step with the collimator wall on which it is arranged. The end stop element may be present substantially as a protrusion of the collimator wall that protrudes at least beyond the wall height and is formed in a portion of the collimator wall and that provides an areal region as an end stop surface. The areal region then extends substantially parallel to the stacking direction.

The extent of the end stop element along the stacking direction and/or a direction perpendicularly thereto is selected so that in the provision of a stacked arrangement of the anti-scatter grid and the sensor element, the end stop element may serve as a positioning aid of the collimator element relative to the sensor element, i.e. in that a sufficient end stop surface is provided by the end stop element for the sensor element, so that a secure positioning is enabled. This may also be selected dependent upon whether one or a plurality of end stop elements is provided on the collimator element for the positioning of a sensor element.

With a provision of a stacked arrangement of an anti-scatter grid and a sensor element, a direct orientation of a sensor element relative to the collimator element of the anti-scatter grid may take place by the end stop element. An orientation on the basis of end stop surfaces on the mounting tool may be dispensed with. This substantially corresponds to a shortening of the tolerance chain so that a more accurate mounting of the sensor relative to an anti-scatter grid is possible. The accuracy of the relative orientation between the anti-scatter grid and the sensor element may thereby be improved to the sum of the two tolerances including tolerance of the end stop surface of the sensor and tolerance of the end stop surface of the collimator element. Complex and high precision assembly tools may also be, at least partially, dispensed with.

A collimator element may also have a plurality of end stop elements that are arranged distributed on the collimator element such that they delimit an area that is equal to the areal extent of a sensor element that is to be arranged in a stacked arrangement therewith, at least on two sides. A delimitation along two sides also provides an exact positioning of the sensor element relative to the collimator element along these two sides. A delimitation along two sides may also be achieved in that an end stop element is formed across a corner and therefore along two directions that are perpendicular to one another and to the stacking direction. There may also be differently configured end stop elements that differ in their shape.

According to a variant of the anti-scatter grid, the collimator element of the anti-scatter grid may include at least twice the areal extent of a sensor element that is to be arranged in a stacked arrangement therewith. The collimator element includes a plurality of end stop elements that are arranged distributed on the collimator element such that the end stop elements delimit at least two areas that are each equal to the areal extent of a sensor element that is to be arranged in a stacked arrangement therewith, each at least on one side. For example, end stop elements may also be positioned on the collimator element such that each area is delimited on at least two sides by the end stop surface of the end stop elements. A plurality of sensor elements may be positioned in a manner optimized for tolerances relative to a collimator element.

The collimator element may be manufactured by an additive production technique. An additive production technique includes a process in which a component is built up on the basis of digital 3D design data by way of the deposition of material in layers. In this way, a high degree of variability in the configuration is possible. Thereby a time-efficient and resource-conserving production, including complex but simultaneously stable structures and forms is possible. Dependent upon the starting material and application, the components may be produced with a method of stereolithography, laser sintering or 3D printing. Materials that are available are different metals, plastics and composite materials.

For example, the collimator element may be produced by a method of selective laser melting or laser sintering. A powdered material including a metal powder may be used. Therein, initially a thin layer of the powdered material is applied to a construction platform. By a laser, the powder may be melted exactly at the sites that are specified by the computer-generated component design data. Thereafter, the construction platform is lowered, and a further powder application is made. The material is melted again and connects at the defined sites to the layer thereunder.

By a method of selective laser melting and/or laser sintering, a high-volume density of a metallic material may be achieved in the collimator walls.

According to a variant, the at least one end stop element may be connected to the collimator wall via a predetermined fracture site. In this way, following the stacked arrangement of the anti-scatter grid with the sensor element, the end stop element may be separated from the collimator wall. By way of a separation of the end stop element after a relative positioning, it may be prevented that the end stop element hinders further construction steps. Furthermore, by way of the predetermined fracture site, a defined separating edge may be predetermined.

A separation may be carried out by way of a mounting tool provided therefor. For example, for this purpose, on the at least one end stop element, a gripping element for such a mounting tool may be provided, on which the mounting tool may grip and may exert a force on the end stop element for a separation of the end stop element. This may be provided, for example, in the form of a protrusion provided on the end stop element. However, other variants of a gripping element may also be provided.

The predetermined fracture site may be provided as a wall region of the collimator wall with an increased porosity relative to the remainder of the collimator wall. Alternatively, the predetermined fracture site may be provided in the form of a perforation of the collimator wall. Alternatively, a site that is narrowed with regard to the wall thickness and relative to the wall thickness of the collimator wall may be configured as a predetermined fracture site. A combination of these variants may also be provided.

During a production of the collimator element by an additive production technique for example, a predetermined fracture site may easily be provided for in the production. This may be achieved, for example, by way of a coarser grain of a metal powder in the relevant wall region, whereby the density and porosity of the collimator wall may be influenced in this region or in that corresponding perforations or a wall thickness narrowing are provided in the design of the collimator element.

If the anti-scatter grid includes a plurality of end stop elements, each end stop element may be connected to the respective collimator wall via a predetermined fracture site. However, a first portion of the end stop elements may be connected via a predetermined fracture site to a respective collimator wall and a second portion of the end stop elements may be connected without a predetermined fracture site to a respective collimator wall. This may be the case, for example, if only a portion of the end stop elements must be removed for a further mounting and another portion represents no impairment. For example, end stop elements of this type that are not arranged on an outer wall of the collimator element may be provided with predetermined fracture sites for a separation.

An anti-scatter grid may also have further elements. For example, an anti-scatter grid may also have a plurality of collimator elements that are arranged adjoining one another and, for example, are adhesively bonded to one another. This may serve to provide a larger area by the anti-scatter grid. Furthermore, the anti-scatter grid may have further elements necessary for a mounting or fastening, that are connected to the collimator element.

Embodiments further relates to an X-ray detector including at least one sensor element for X-ray radiation and at least one anti-scatter grid in a stacked arrangement.

The X-ray detector may be a direct-converting or an indirect-converting X-ray detector. The X-ray radiation and/or the X-ray photons may be converted in direct-converting X-ray detector apparatuses into electrical pulses by way of a suitable converter material. As the converter material, for example, CdTe, CZT, CdZnTeSe, CdTeSe, CdMnTe, InP, TlBr2, HgI2, GaAs or other substances may be used as described above. The electrical pulses are evaluated by electronic circuits of an evaluating unit, for example, in the form of an integrated circuit (Application Specific Integrated Circuit, ASIC). In counting X-ray detector apparatuses, incident X-ray radiation may be measured by counting the electrical pulses that are triggered by the absorption of X-ray photons in the converter material. The size of the electric pulse is also typically proportional to the energy of the absorbed X-ray photon. An item of spectral information may be extracted through the comparison of the size of the electrical pulse with a threshold value.

The X-ray radiation and/or the photons may be converted in indirect-converting X-ray detector apparatuses by way of a suitable converter material into light and by optically coupled photodiodes into electrical pulses. As the converter material, scintillators, for example GOS (Gd2O2S), CsJ, YGO or LuTAG may be utilized. The electrical signals generated are further processed via an evaluating unit including electronic circuits, read out and are subsequently passed on to a computing unit.

The X-ray detector may include a matrix-like arrangement of a plurality of pixel elements for a positionally-resolved scan of the incident X-ray radiation. The position of the anti-scatter grid, for example the through channels and the collimator walls may be oriented relative to the matrix-like arrangement of the plurality of pixel elements. For example, a collimator wall may be associated with each pixel element or group of pixel elements. For example, a collimator wall may be arranged, in each case, between two adjoining pixel elements or between adjoining groups of pixel elements, for example, macropixels. For example, an arrangement takes place in such a way that as little as possible of a sensitive area of a pixel element is covered by a collimator wall, so that a worsening of the dose efficiency may be avoided. In some variants, however, collimator walls are arranged entirely or partially over the detection surface of a pixel element that is sensitive to X-ray radiation.

According to a variant of the X-ray detector, the collimator element of the anti-scatter grid and the at least one sensor element are adhesively bonded to one another. This serves for the final fixing of the elements. In addition, other connecting possibilities may also be provided.

Embodiments further relate to a medical imaging device with an X-ray detector as described above and, opposite to the X-ray detector, an X-ray source that is configured to irradiate the X-ray detector along the beam incidence direction with X-ray radiation.

For the recording of the X-ray image dataset, for example, the object to be imaged may then be placed, for example, between the X-ray source and the X-ray detector and trans irradiated by the X-ray source.

For example, the medical imaging device may be configured as a computed tomography system. However, by way of example, it may also be configured as a C-arm X-ray device and/or a Dyna-CT or as some other X-ray-based imaging device.

All embodiment variants that were described above in the context of the anti-scatter grid may accordingly also be provided in the X-ray detector apparatus or the medical imaging device. The description given with regard to the anti-scatter grid and the previously described advantages of the anti-scatter grid may accordingly be transferred also to the X-ray detector apparatus and the medical imaging device. With a stacked arrangement of a sensor element and an anti-scatter grid positioned better relative to one another, an improved image quality may be achieved if image datasets are recorded with the X-ray detector and/or with the medical imaging device.

Embodiments further relate to a method for providing a stacked arrangement of an anti-scatter grid and at least one sensor element for the detection of X-ray radiation including the steps: providing an anti-scatter grid including at least one collimator element according to one of the variants described above, providing a sensor element, relative positioning of the collimator element and the sensor element over one another along a stacking direction so that an outer edge of the sensor element is in abutment with at least one end stop element of the collimator element, and fixing the relative position of the anti-scatter grid and the sensor element.

A stacked arrangement may be provided that provides a precise orientation of the sensor element relative to the collimator element of the anti-scatter grid, in that a shortening of the tolerance chain is achieved. The complexity and the demands with regard to precision may be at least partially reduced.

In one variant of the method, in addition, the step of removing the end stop element from the collimator element occurs. This takes place, for example, after positioning and fixing the collimator element and the sensor element to one another. Therein, the end stop element is connected via a predetermined fracture site to the collimator element in order to enable a defined removal in a simplified manner. The end stop element cannot hinder further mounting steps.

In a further variant, the collimator element of the anti-scatter grid includes a multiple of the areal extent of a sensor element, and a plurality of sensor elements are positioned relative to the collimator element. Before the relative positioning of a second sensor element, at least one end stop element is removed from a collimator wall.

A plurality of sensor elements may be precisely positioned successively relative to a common collimator element, without the end stop element hindering a positioning and mounting.

The advantages of the proposed method substantially correspond to the advantages of the proposed anti-scatter grid. Features, advantages or alternative embodiments mentioned herein may also be transferred to the other claimed subject matter and vice versa.

In addition, features that are described in relation to different embodiments may be combined to further embodiments. Apart from the embodiments expressly described in this application, many further embodiments are conceivable, at which a person skilled in the art may arrive without departing from the scope.

The use of the indefinite article "a" or "an" does not preclude that the relevant feature may also be present plurally. The use of the expression "have" does not preclude that the concepts linked by the expression "have" may be identical. For example, the medical imaging device has the medical imaging device. The use of the expression "unit" does not preclude that the subject matter to which the expression "unit" relates may have a plurality of components that are spatially separated from one another.

DETAILED DESCRIPTION

Figure 1:
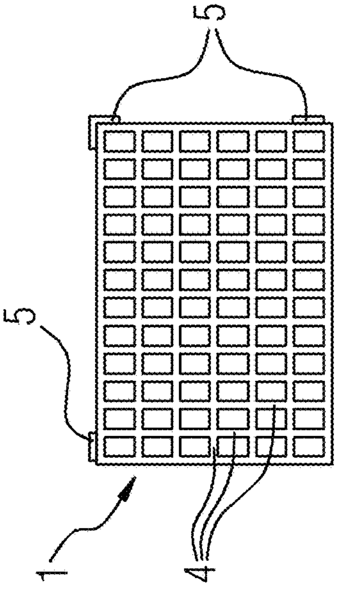
FIG. 1 depicts a schematic representation of a collimator element of an anti-scatter grid according to an embodiment.

FIG. 1 depicts a schematic representation of a collimator element 1 of an anti-scatter grid. For example, a plan view of a collimator element 1 of this type is shown. The anti-scatter grid is provided for a stacked arrangement with a sensor element 3 for the detection of X-ray radiation.

The plan view depicts a radiation exit side of a collimator element 1 that, in the presence of the stacked arrangement of the sensor element 3 and the anti-scatter grid, faces toward the sensor element 3. A stacking direction would correspondingly extend along the viewing axis, i.e. perpendicularly to the drawing plane.

The collimator element 1 includes a first plurality of collimator walls 4 including a wall height 2, that are arranged adjoining one another in at least a first direction perpendicularly to the stacking direction. The wall height 2 therein corresponds to the extent of a respective collimator wall 4 along the stacking direction, i.e. here the extent perpendicularly to the drawing plane.

In the case shown, according to one variant, the collimator element 1 has, in addition to the first plurality of collimator walls 4 described above, a second plurality of collimator walls 4 that are arranged adjoining one another in a second direction perpendicularly to the first direction and perpendicularly to the stacking direction. An improved suppression of the scattered radiation along two directions is enabled, as a result of which an improved image quality may be achieved when a stacked arrangement including an anti-scatter grid of this type is used in an X-ray detector 36.

The collimator walls 4 are configured and/or oriented substantially parallel to the stacking direction, although a deviation of the parallel orientation from the stacking direction of up to 10 degrees, for example less than 5 degrees may be included. This may take account of an orientation to a focus point of an X-ray source 37 that is used in combination with the anti-scatter grid.

The collimator walls 4 preferably have a material that absorbs X-ray radiation such that a suppression of scattered radiation that arises in an imaging application during an exposure and transirradiation of an object is ensured to a sufficient extent, at least along the first direction. For example, the collimator walls may include a metallic material. The collimator walls include, for example, tungsten. However, the plurality of collimator walls may also include lead, molybdenum, zinc or another material or composite material.

At least one collimator wall 4 of the collimator element 1 includes at least one end stop element 5 in the form of a protrusion protruding beyond the wall height 2 along the stacking direction for positioning a sensor element 3 relative to the collimator element 1. The collimator element 1 shown here by way of example even has a plurality of end stop elements 5 that are arranged distributed over the collimator element 1. The respective end stop elements 5 protrude beyond the wall height 2 of a respective collimator wall 4 on which they are arranged. In the case shown, an end stop element 5 protrudes out of the drawing plane beyond the collimator wall 4. A respective end stop element 5 therein advantageously forms an end stop surface for a sensor element 3 to be positioned in a stacked arrangement thereon when positioning the sensor element 3 relative to the collimator element 1.

The arrangement of the end stop elements 5 as shown is merely exemplary. For example, the end stop elements 5 may also be arranged at other sites on the collimator element 1, for example such that the end stop elements 5 are advantageous for a relative positioning of a sensor element 3 relative to the collimator element 1. A respective end stop element 5 is arranged on the collimator element 1 such that, by way of the end stop element 5, an area facing the sensor element 3, in the stacked arrangement, on the radiation exit side of the collimator element 1 is delimited at least on one side, that is equal to the areal extent of a sensor element 3 that is to be arranged in a stacked arrangement therewith. This area that is delimited on at least one side by the end stop element 5 is then provided in a preparation of a stacked arrangement for the arrangement of the sensor element 3. A plurality of end stop elements 5, for example an area of this type is delimited on two sides in order to ensure an orientation along two directions in a particularly advantageous manner. However, other embodiments are also conceivable.

Each end stop element 5 may be made of the same material as the collimator wall 4. The end stop element 5 may be provided, for example, integrally with the collimator wall 4 on which it is arranged. The end stop element may be present as a protrusion of the collimator wall 4 protruding at least beyond the wall height 2, the protrusion being formed in a portion of the collimator wall 4. In the example shown, the end stop elements 5 are each arranged externally on outer walls of the collimator element 1 and protrude beyond the wall height 2, so that an areal end stop surface is formed. In addition thereto, other variants are also conceivable. For example, an arrangement of this type may also be provided that does not protrude beyond the wall thickness of a collimator wall 4, but only exists as a wall region protruding along the stacking direction. For example, this is dependent upon the existing requirements and the design of the components.

The collimator element 1 is produced by an additive production technique, for example by a method of selective laser melting and/or laser sintering of a metal powder, for example tungsten, so that advantageously a high-volume density of a metallic material is achieved in the collimator walls.

According to an embodiment of the anti-scatter grid, at least one end stop element 5 may be connected via a predetermined fracture site 7 to the respective collimator wall 4 so that the end stop element 5 may be more easily separated from the collimator wall 4 when it is no longer needed.

Figure 2:
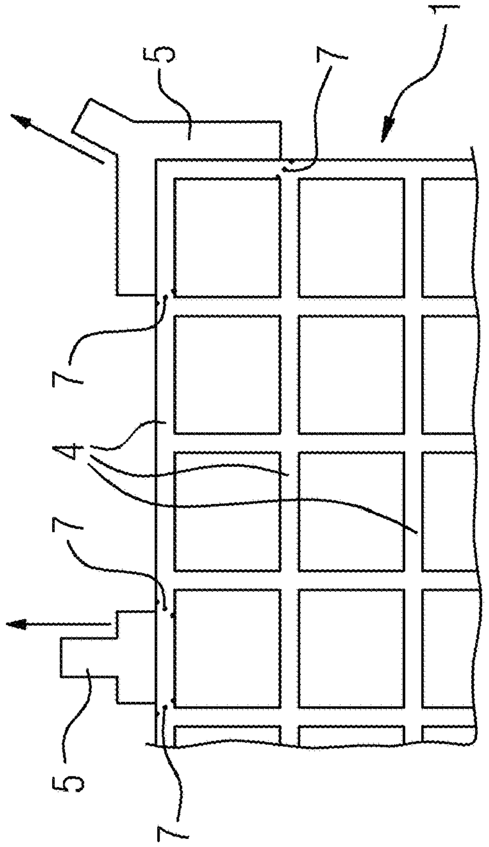
FIG. 2 depicts a schematic representation of a portion of a collimator element of an anti-scatter grid according to an embodiment.

This is shown in greater detail in FIG. 2. FIG. 2 depicts a schematic representation of a portion of a collimator element 1 of an anti-scatter grid with two end stop elements 5 that are connected via predetermined fracture sites 7 to the collimator element 1. The arrangement of the end stop elements 5 as shown on the collimator element 1 and its concrete configuration is merely exemplary. By way of a separation of end stop elements 5, it may be prevented that the end stop element 5 hinders further construction steps. Furthermore, the provision of predetermined fracture sites 7 enables a defined separation.

A predetermined fracture site 7 may be provided as a wall region of the collimator wall 4 with an increased porosity relative to the remainder of the collimator wall 4. Alternatively, the predetermined fracture site 7 may be provided in the form of a perforation of the collimator wall 4. Alternatively, a predetermined fracture site may be configured as a wall region narrowed with regard to a wall thickness and relative to the wall thickness of the collimator wall 4. A combination of these variants may also be provided. For example, during a production of the collimator element 4 by an additive production technique, this may be implemented in a particularly simple manner during the manufacturing.

The end stop elements 5 shown also have an engagement element in the form of a protrusion and/or an extension that stands out from the end stop element 5 on a side facing away from the collimator element. For example, a mounting tool provided therefor may grip such an engagement element and may exert a force on the end stop element 5 so that a separation of the end stop element 5 (indicated by the arrows) from the collimator element 1 may be achieved via the predetermined fracture site 7. Apart from the variant shown here, other embodiments of such an engagement element may also exist that enables a separation of an end stop element 5 in a simplified manner.

In the presence of a plurality of end stop elements 5, each of the end stop elements 5 may be connected via a predetermined fracture site 7 to a collimator wall 4, or merely a first portion of the end stop elements 5 may be connected via a predetermined fracture site to the respective collimator wall 4 and a second portion of the end stop elements 5 may be connected without predetermined fracture sites 7 to the respective collimator wall 4. At least these end stop elements may then be connected via a predetermined fracture site 7, that in further mounting steps are obstructive.

Figure 3:
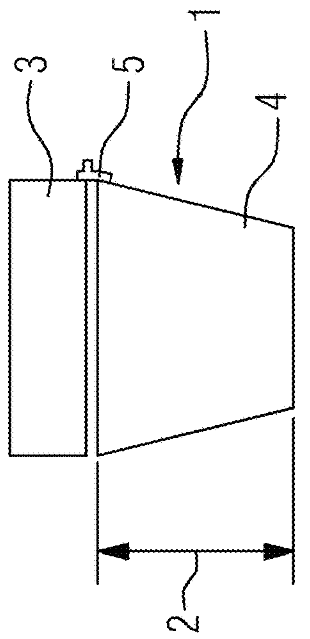
FIG. 3 depicts a schematic representation of a stacked arrangement of a sensor element and an anti-scatter grid according to an embodiment.

FIG. 3 depicts a schematic representation of a stacked arrangement of a sensor element 3 and an anti-scatter grid 1 as may be provided in an X-ray detector 36. Adhesive bonding may take place between the sensor element 3 and the collimator element. A different fixing of the anti-scatter grid relative to the sensor element 3 may also take place. The sensor element 3 is therein positioned in abutment with the end stop element 5 that protrudes in the stacking direction beyond the wall height 2 of the collimator element 1 and thus provides an end stop surface for the sensor element 3.

The stacking direction is herein parallel to the wall height 2 as drawn. Since herein only a front view of the stacked arrangement is shown, only an outer wall of the collimator element 1 is visible. The collimator element also has a plurality of collimator walls arranged adjoining one another at least along a direction perpendicular to the stacking direction. For example, herein a 3D collimator as shown in FIGS. 1 and 2 may be present. In this case as shown, however, the orientation of the collimator walls to a focus point (not shown) is indicated by the tapering shape of the outer wall from the broader radiation exit side toward the narrower radiation entry side of the collimator element 1. It is intended to illustrate this purely schematically and represents, for example, no scale-accurate representation.

Figure 4:
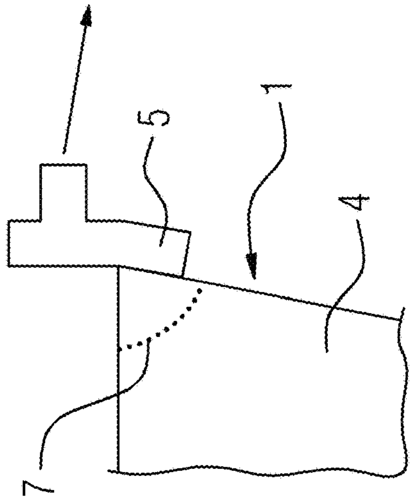
FIG. 4 depicts an enlarged portion of the schematic representation in FIG. 3 according to an embodiment.

As shown in a detailed view in FIG. 4, the end stop element 5 may, however, also be connected via a predetermined fracture site 7 to the collimator element 1, so that after fixing the sensor element 3 relative to the collimator element 1, a removal of the end stop element 5 may take place if desired.

The sensor element 3 may therein be configured as a direct-converting or an indirect-converting sensor element 3. For example, the sensor element 3 that is provided for the stacked arrangement with the anti-scatter grid may include CdTe, CZT, CdZnTeSe, CdTeSe, CdMnTe, InP, TlBr2, HgI2, GaAs or other material. It may however also include, for example, GOS (Gd2O2S), CsJ, YGO or LuTAG.

The stacked arrangement or an X-ray detector 36 may also have further elements, for example, a readout circuit that is associated with the sensor element 3 and is responsible for a readout of the signals generated in the sensor as a reaction to incident X-ray radiation. The stacked arrangement or an X-ray detector 36 may also have a carrier ceramic material, circuit boards and suchlike in order to enable the functioning of such a stacked arrangement on use in an X-ray detector. For example, an X-ray detector may include a plurality of such stacked arrangements.

Figure 5:
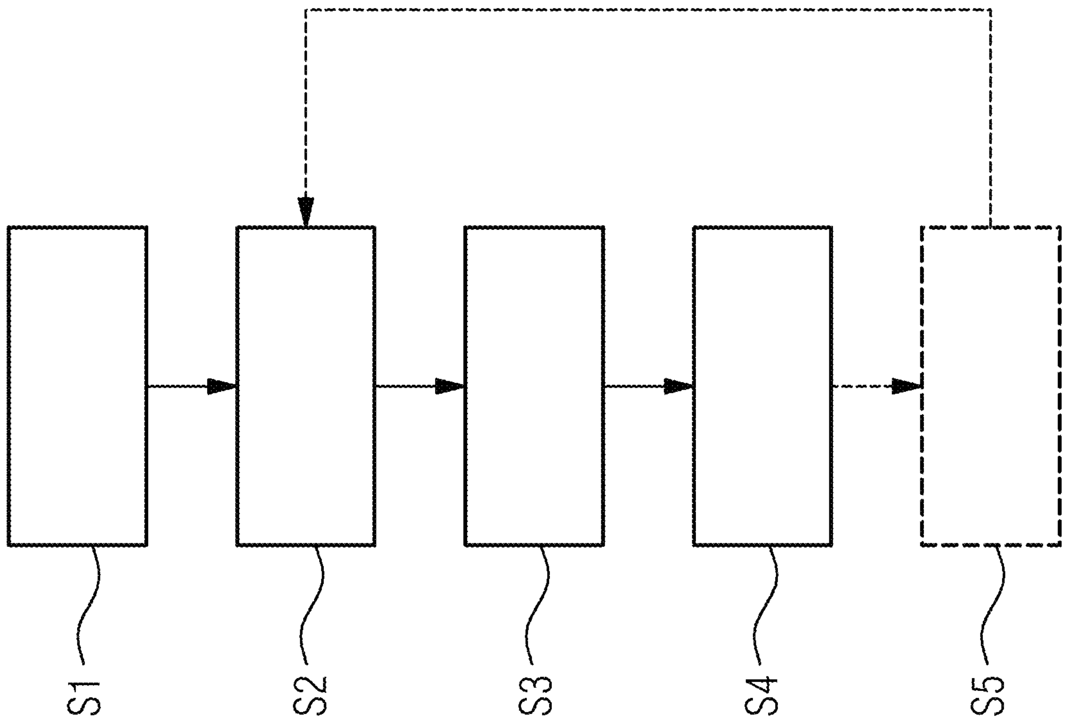
FIG. 5 depicts a schematic sequence of a method for providing a stacked arrangement of an anti-scatter grid and at least one sensor element according to an embodiment.

FIG. 5 depicts a schematic representation of a sequence of a method for providing such a stacked arrangement of an anti-scatter grid and at least one sensor element 3.

The method includes the steps: providing S1 an anti-scatter grid including at least one collimator element 1 according to one of the variants described above, providing S2 a sensor element 3, relative positioning S3 of the collimator element 1 and the sensor element 3 over one another along a stacking direction so that an outer edge of the sensor element 3 is in abutment with at least one end stop element 5 of the collimator element 1, and fixing S4 the relative position of the anti-scatter grid and the sensor element 3.

In one variant thereof, after the positioning S3 and fixing S4, there follows the step of removing S5 the end stop element 5 from the collimator element 1. Therein, the end stop element 5 is connected via a predetermined fracture site 7 to the collimator element in order to enable a defined removal in a simplified manner. In addition, a plurality of end stop elements 5 may be provided that are removed in the step of removal S5.

Figure 8:
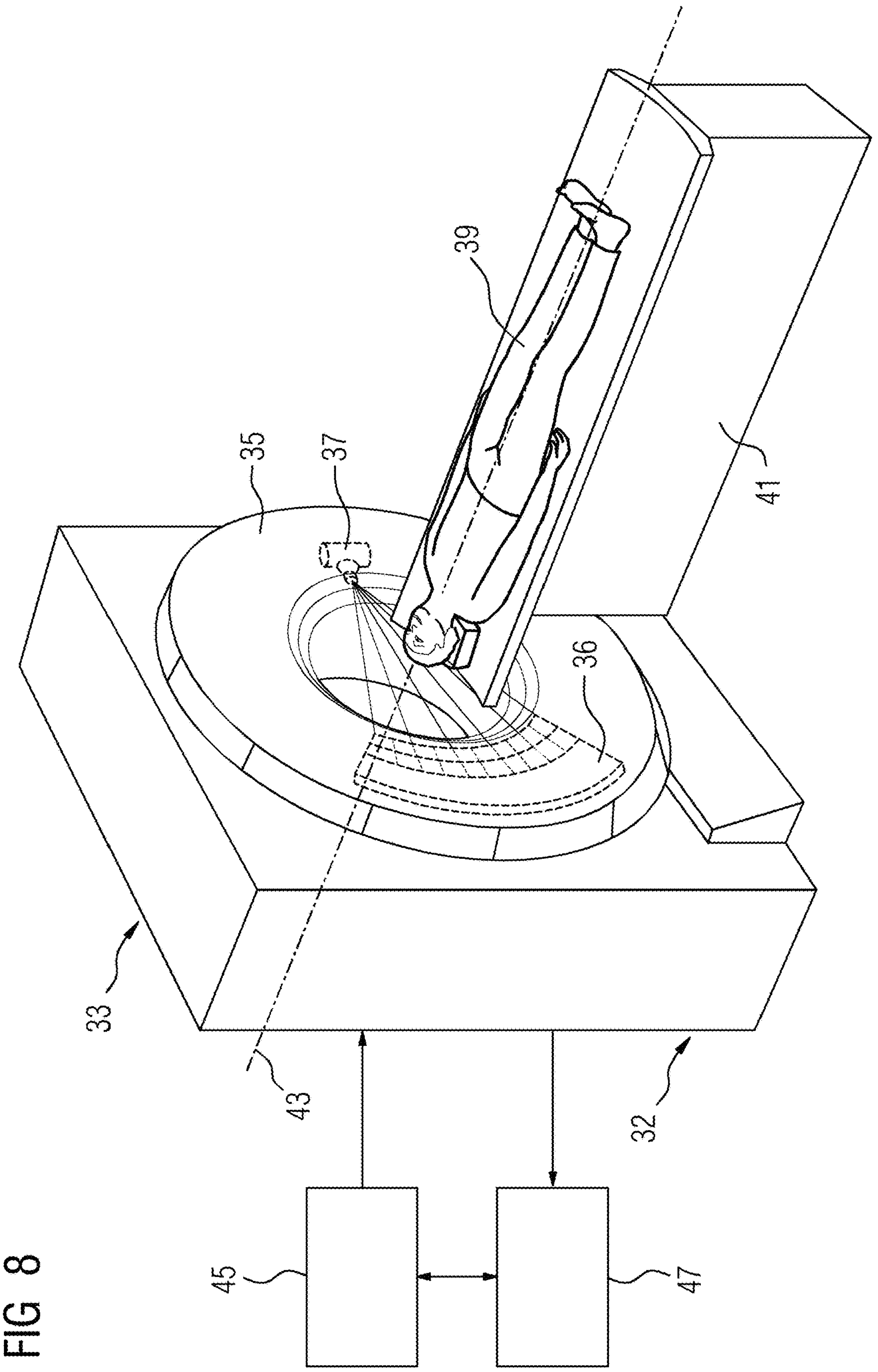
FIG. 8 depicts a schematic representation of a medical imaging device according to an embodiment.

In a further variant of the method, a plurality of sensor elements 3 are associated with one common collimator element 1. The collimator element 3 of the anti-scatter grid then includes a multiple of the areal extent of a sensor element 3, and a plurality of sensor elements 3 are positioned relative to the collimator element 1. For example, sensor elements 3 may be provided (S2) repeatedly and subsequently positioned (S3) relative to the collimator element 1. Therein, as depicted in FIG. 8, it may be provided that before the relative positioning S3 of a second sensor element 3, at least one end stop element 5 is removed from a collimator wall 4 (S5), in the event that it is hindering for the positioning of the second sensor element 3. However, method variants are also conceivable where before the positioning of a second sensor element 3, a removal of an end stop element 5 does not necessarily have to be provided.

Figure 6:
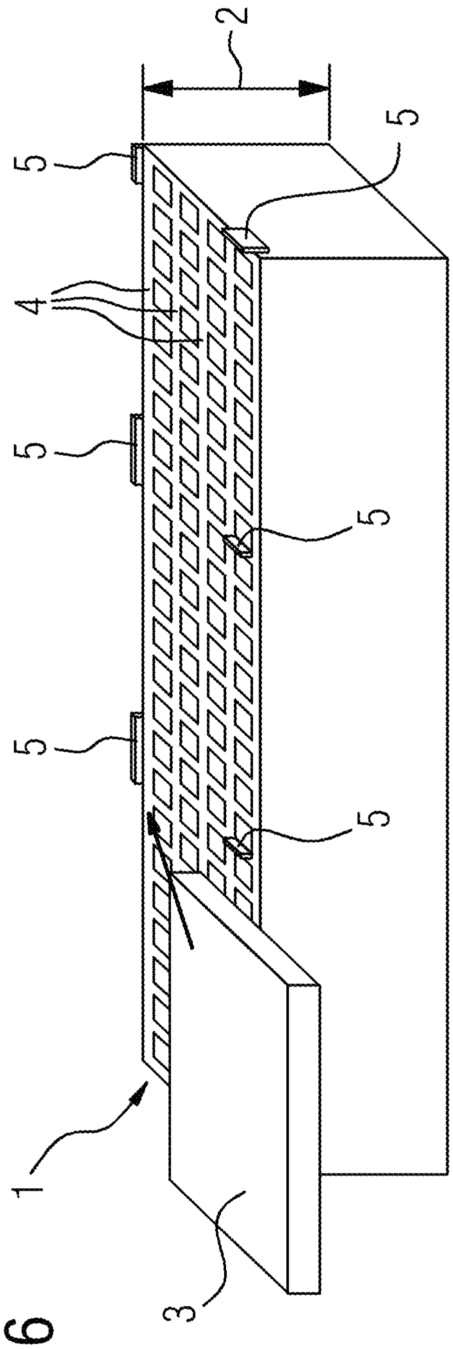
FIGS. 6 and 7 show a schematic representation of a collimator element of an anti-scatter grid during a provision of a stacked arrangement with a plurality of sensor elements at two different time points according to an embodiment.
Figure 7:
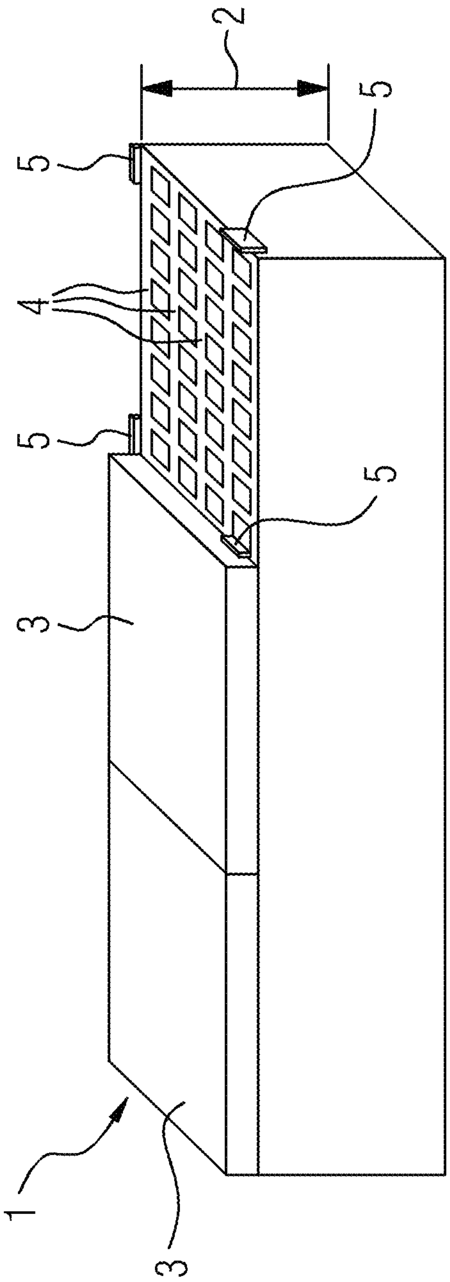

A method variant with a plurality of sensor elements 3 is depicted again in FIGS. 5 and 6. FIGS. 6 and 7 depict a schematic representation of a collimator element 1 of an anti-scatter grid during a provision of a stacked arrangement with a plurality of sensor elements 3 at two different time points during the provision of the stacked arrangement.

The collimator element 1 of the anti-scatter grid herein has three times the areal extent of the sensor elements 3 that are to be arranged in a stacked arrangement therewith. The collimator element 1 also has a plurality of end stop elements 5 that are arranged distributed on the collimator element 1 such that they delimit at least three areas that are each equal to the areal extent of a sensor element 3 that is to be arranged in a stacked arrangement therewith, in each case on two sides.

A first provided sensor element 3 is positioned (indicated by the arrow) using a first portion of end stop elements 5 relative to the collimator element in a stacked arrangement thereto, such that outer edges of the sensor element 3 are in abutment with the end stop surfaces of the first portion of end stop elements 5. After a fixing of the first sensor element 3 and of the collimator element 1, for example by adhesive bonding, at least one end stop element 5 is removed. In the case shown, at least the left-hand lower end stop element 5 is removed.

Subsequently, a further sensor element 3 is provided and is positioned by a second portion of end stop elements 5 relative to the collimator element 1 and finally fixed. The same would be carried out with a third sensor element 3, although this is not shown here.

Dependent upon necessity, all of the end stop elements 5 may be removed or possibly only a proportion of the end stop elements 5.

FIG. 8 depicts an embodiment of a medical imaging device 32 with an X-ray detector 36 and an X-ray source 37 placed opposite to the X-ray detector 36. The X-ray source 37 is configured to irradiate the X-ray detector 36 with X-ray radiation along a beam incidence direction. The medical imaging device 32 shown is configured, for example, as a computed tomography system. The computed tomography system contains a gantry 33 with a rotor 35. The rotor 35 includes the X-ray source 37 and the X-ray detector 36. The rotor 35 is rotatable about the rotation axis 43. The examination object 39, in this case a patient, is positioned on the patient support 41 and is movable along the rotation axis 43 through the gantry 33. For the control of the computed tomography system and for calculating sectional images and/or volume images of the object, a computing unit 45 is used. The computing unit 45 in the form of a computer system is configured to reconstruct X-ray image data on the basis of the data of the X-ray detector 36 of the computed tomography device. A further computer system serves as an operator console 47. The software installed on the operator console 47 provides the operator to control the operation of the computed tomography system, such as, for example the selection of a protocol, the start of the scanning, etc. The operator console 47 may also be configured as a computer system.

The X-ray detector 36 may include, for example, a plurality of stacked arrangements of at least one sensor element 3 and an anti-scatter grid and/or a plurality of stacked arrangements as described above provided in accordance with the method, so that by way of stacking together the respective detection surfaces of the sensor elements 3, in total a large overall detection surface may be formed.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. An anti-scatter grid for stacked arrangement with a sensor element for a detection of X-ray radiation, the anti-scatter grid comprising:

a collimator element formed as a single, integral component and including a plurality of collimator walls having a wall height along a stacking direction, wherein the plurality of collimator walls are arranged adjoining one another in at least one first direction perpendicularly to the stacking direction;

wherein at least one collimator wall of the collimator element includes at least one end stop element that extends beyond the wall height in the stacking direction and defines a stop surface that positions the sensor element at a predetermined position relative to the collimator element along the stacking direction;

wherein the at least one end stop element is connected to the plurality of collimator walls via a predetermined fracture site, wherein the predetermined fracture site is provided as a wall region of the plurality of collimator walls with an increased porosity relative to a remainder of the plurality of collimator walls.

2. The anti-scatter grid of claim 1, wherein the collimator element is produced by an additive production technique.

3. The anti-scatter grid of claim 2, wherein the collimator element is produced by a method of selective laser melting or laser sintering.

4. The anti-scatter grid of claim 1, wherein the collimator element includes a plurality of end stop elements that are arranged distributed on the collimator element such that they delimit an area which is equal to an areal extent of a sensor element that is to be arranged in a stacked arrangement therewith, at least on two sides.

5. The anti-scatter grid of claim 1, wherein the collimator element of the anti-scatter grid includes at least twice an areal extent of a sensor element that is to be arranged in a stacked arrangement therewith, and wherein the collimator element includes a plurality of end stop elements that are arranged distributed on the collimator element such that they delimit at least two areas that are each equal to the areal extent of a sensor element that is to be arranged in a stacked arrangement therewith, each at least on one side.

6. The anti-scatter grid of claim 5, wherein a first portion of the end stop elements is connected via a predetermined fracture site to a respective collimator wall and a second portion of the end stop elements is connected without predetermined fracture sites to the respective collimator wall.

7. An X-ray detector comprising:

at least one sensor element for X-ray radiation; and at least one anti-scatter grid comprising:

a collimator element formed as a single, integral component and including a plurality of collimator walls including a wall height extending along a stacking direction, wherein the plurality of collimator walls are arranged adjoining one another in at least one first direction perpendicularly to the stacking direction of a stacked arrangement, wherein at least one collimator wall of the collimator element includes at least one end stop element that extends beyond the wall height in the stacking direction and defines a stop surface that positions the sensor element at a predetermined position relative to the collimator element along the stacking direction, wherein the at least one end stop element is connected to the plurality of collimator walls via a predetermined fracture site, wherein the predetermined fracture site is provided in a form of a perforation of the plurality of collimator walls.

8. The X-ray detector of claim 7, wherein the collimator element of the anti-scatter grid and the at least one sensor element are adhesively bonded to one another.

9. The X-ray detector of claim 7, further comprising: an X-ray source placed opposite to the X-ray detector that is configured to irradiate the X-ray detector with X-ray radiation.

10. A method for providing a stacked arrangement of an anti-scatter grid and at least one sensor element for detection of X-ray radiation, the method comprising:

providing an anti-scatter grid comprising at least one collimator element formed as a single, integral component and having a plurality of collimator walls with a wall height extending along a stacking direction;

providing the at least one sensor element;

relative positioning of the collimator element and the sensor element over one another along the stacking direction such that the sensor element is brought into abutment with at least one end stop element integrally formed on at least one collimator wall, the end stop element extending beyond the wall height and defining a stop surface that positions the sensor element at a predetermined position relative to the collimator element;

fixing the relative position of the anti-scatter grid and the sensor element; and removing the end stop element from the collimator element.

11. The method of claim 10, wherein a plurality of sensor elements are associated with a common collimator element, wherein firstly a first sensor element of the plurality of sensor elements is positioned relative to the collimator element and a second sensor element of the plurality of sensor elements is positioned relative to the collimator element, and wherein before the positioning of the second sensor element, at least one end stop element is removed from the collimator element.

* * * * *